(12) United States Patent
Kotlarski

(10) Patent No.: US 6,530,111 B1
(45) Date of Patent: Mar. 11, 2003

(54) WIPER DEVICE FOR THE WINDOWS OF MOTOR VEHICLES

(75) Inventor: Thomas Kotlarski, Bad Neuenahr (DE)

(73) Assignee: Robert Bosch GmbH, Stuggart (DE)

( * ) Notice: Subject to any disclaimer, the term of this patent is extended or adjusted under 35 U.S.C. 154(b) by 0 days.

(21) Appl. No.: 09/701,219

(22) PCT Filed: Nov. 6, 1999

(86) PCT No.: PCT/DE99/03557
§ 371 (c)(1),
(2), (4) Date: Jan. 2, 2001

(87) PCT Pub. No.: WO00/59761
PCT Pub. Date: Oct. 12, 2000

(30) Foreign Application Priority Data

Mar. 30, 1999  (DE) .......................... 199 14 413

(51) Int. Cl.⁷ .................................. B60S 1/40
(52) U.S. Cl. .................. 15/250.32; 15/250.43
(58) Field of Search ................ 15/250.32, 250.43, 15/250.44, 250.361, 250.451, 250.33

(56) References Cited

U.S. PATENT DOCUMENTS

| | | | | |
|---|---|---|---|---|
| 3,576,044 A | * | 4/1971 | Besnard .................. | 15/250.32 |
| 4,348,782 A | * | 9/1982 | Fournier .................. | 15/250.32 |
| 4,445,249 A |   | 5/1984 | Harbison ................. | 15/250.32 |
| 4,598,438 A | * | 7/1986 | Egner-Walter et al. .. | 15/250.32 |
| 4,670,934 A | * | 6/1987 | Epple et al. ............. | 15/250.32 |

FOREIGN PATENT DOCUMENTS

| | | |
|---|---|---|
| DE | 197 29 865 A | 1/1999 |
| DE | 197 57 872 A1 | 7/1999 |
| EP | 0 255 352 A | 2/1988 |
| FR | 2 254 959 A | 7/1975 |
| FR | 2 365 717 A | 4/1978 |
| GB | 2 238 953 A | 6/1991 |

* cited by examiner

Primary Examiner—Gary K. Graham
(74) Attorney, Agent, or Firm—Michael J. Striker

(57) ABSTRACT

A wiper apparatus is proposed that is used to clean windows of motor vehicles. The wiper apparatus has a wiper arm (18), guided on the motor vehicle and driven in pendulum motion, on whose free end, remote from the pendulum shaft (88), a wiper blade (10), elongated transversely to the pendulum direction (double arrow 86) and capable of being pressed against the window (28), is separably hinged via a connection device (14) that has coupling elements (22 and 16) associated with the wiper arm and the wiper blade, respectively, wherein the pivot axis (54) extends substantially in the pendulum direction, and the wiper apparatus has at least one support shoulder (44, 46 and 68), solidly connected to the wiper arm and pointing toward the pendulum shaft (88), which shoulder is located opposite an associated interception shoulder (62), solidly connected to the wiper blade and pointing away from the pendulum shaft (88). To assure problem-free mounting of the wiper blade on the wiper arm and problem-free removal of the wiper blade from the wiper arm, even if for structural reasons the wiper arm cannot be raised in a plane that is vertical to the window, transverse to the wiping direction, at least one of the two shoulders (44, 46, 68; 62) can be moved counter to a restoring force all the way out of the opposed position relative to the other shoulder (62; 44, 46, 68).

14 Claims, 3 Drawing Sheets

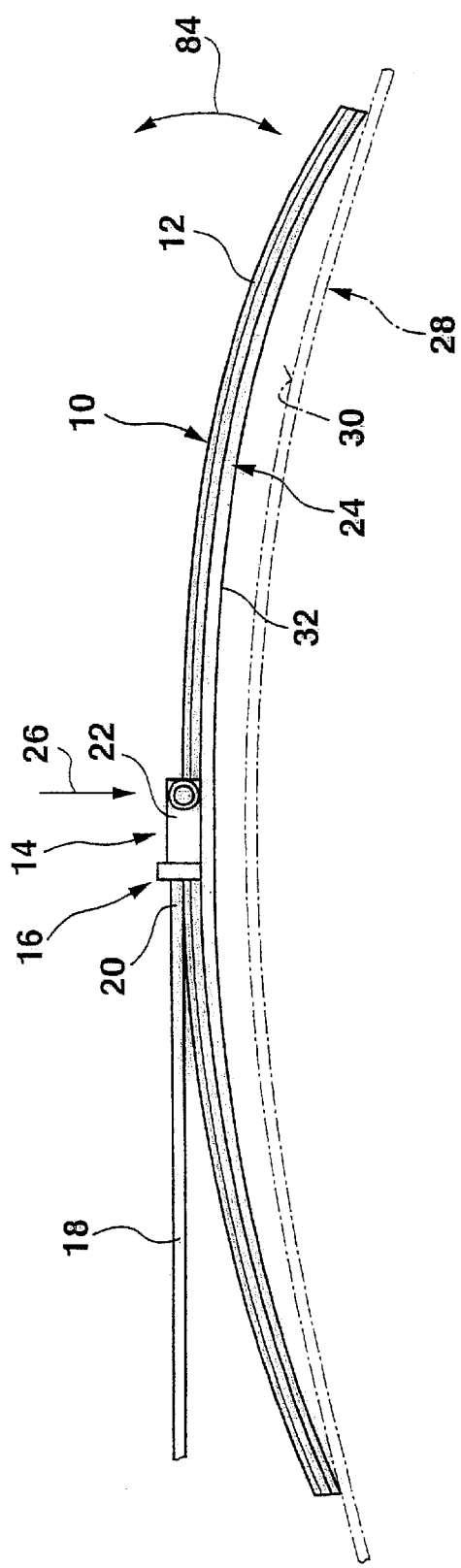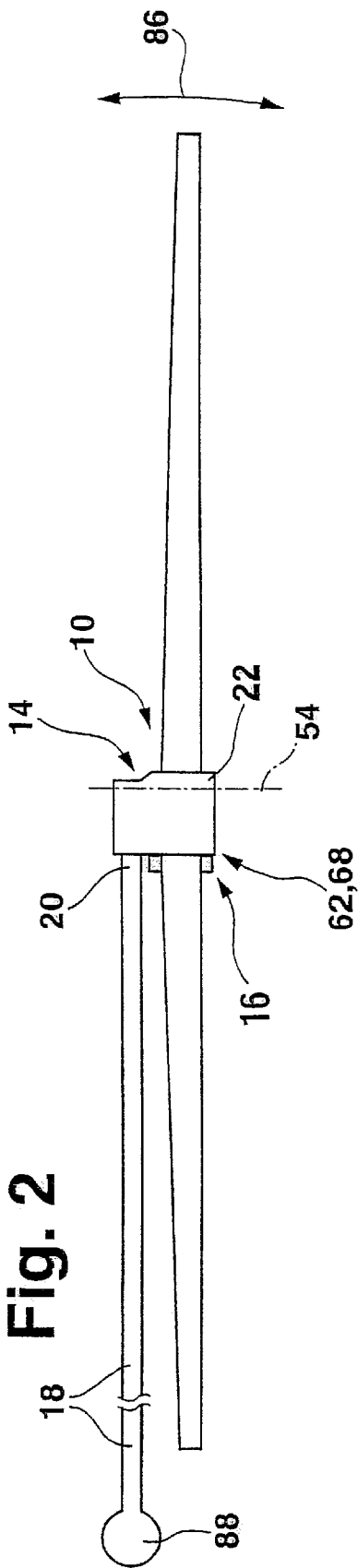

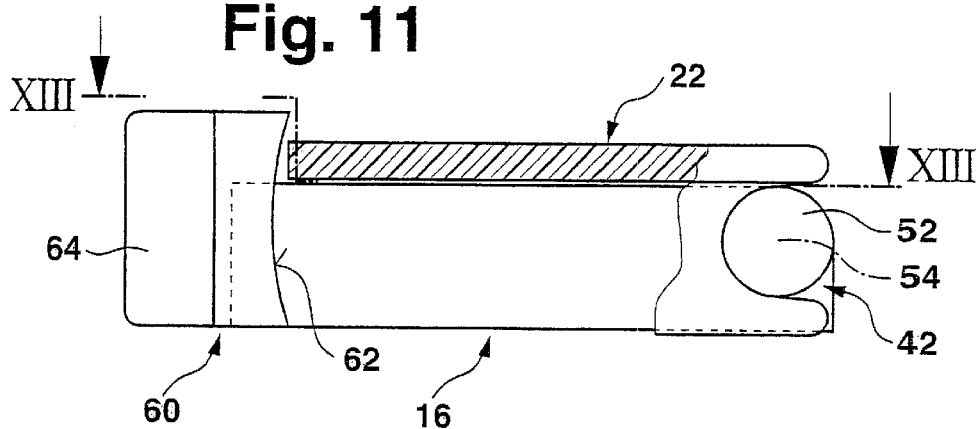
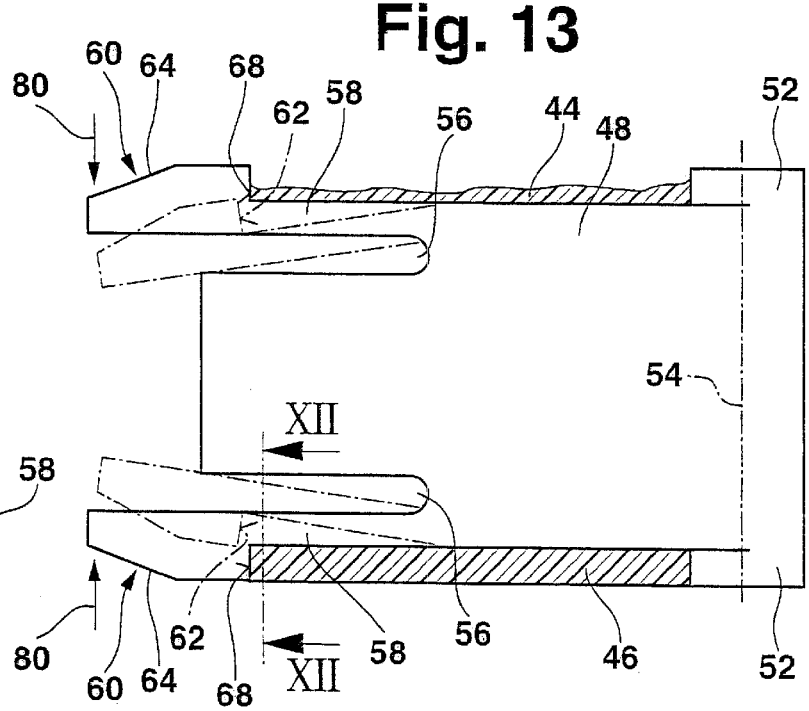
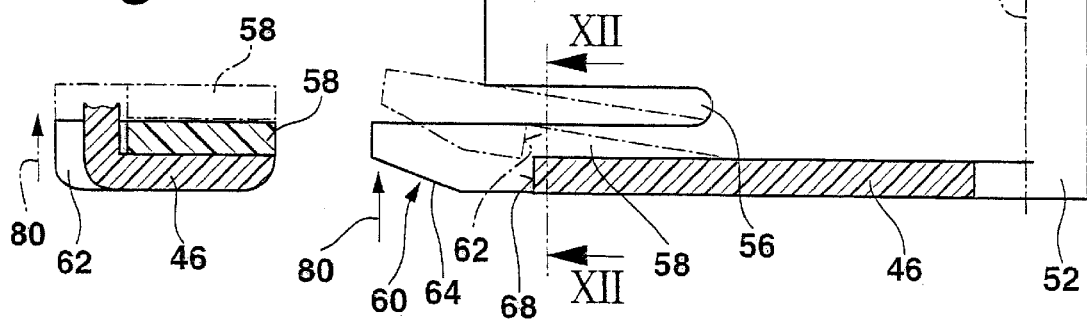
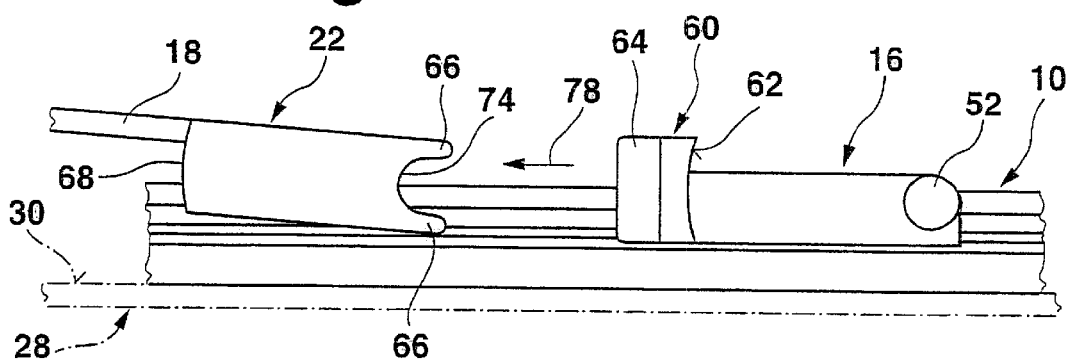

WIPER DEVICE FOR THE WINDOWS OF MOTOR VEHICLES

PRIOR ART

The invention is based generally on a wiper apparatus. In a wiper apparatus of this type in the prior art (German Patent Application DE 19 75 78 72.1, as yet unpublished), the support shoulder and the interception shoulder are intended to absorb the centrifugal force that acts on the wiper blade during wiping operation, so that the hinge between the wiper blade and the wiper arm is entirely relieved relative to this force. Since for mounting the wiper blade on the wiper arm, the wiper arm has to be swiveled away from the window, difficulties arise if—for instance for the sake of vehicle body styling—the swivel joint is concealed by the vehicle body, thus blocking or restricting the swiveling motion.

ADVANTAGES OF THE INVENTION

In the wiper apparatus according to the invention, it is possible to remove the wiper blade from the wiper arm or mount it on it without performing a swiveling motion of the wiper arm beforehand, since once the shoulder or shoulders have been moved out of the opposed position, it is possible to pull the wiper blade off the wiper arm away from the pendulum shaft. This is true particularly for the hinge connection, shown in the exemplary embodiment, between the wiper blade and the wiper arm, in accordance with which a hinge peg of the wiper blade is supported in a bearing fork of the wiper arm that is open in the pull-off direction. Furthermore, the expensive swivel joint can be omitted For production reasons, it is advantageous to dispose the support shoulder that is solidly connected to the wiper arm on the coupling piece associated with the wiper arm, and to dispose the interception shoulder associated with the wiper blade on the coupling part associated with the wiper blade of the connection device.

A wiper apparatus of compact structure is obtained if the support shoulder and the interception shoulder are disposed between the pendulum shaft and the pivot axis.

An especially simple arrangement of the support and interception shoulders can be accomplished if in a feature of the invention the coupling piece associated with the wiper arm has a wall, located in a plane vertical to the window and extending substantially in the direction of the longitudinal axis of the wiper arm, which wall is adjacent to a surface of the coupling part associated with the wiper blade, and if furthermore the support shoulder is embodied on the wall and the interception shoulder is embodied on the surface.

In a connection device of very shallow design, the invention can be realized if the coupling piece associated with the wiper arm, transversely to the longitudinal axis of the wiper arm, has a U-shaped cross section; if furthermore disposed in each of the legs of the U of this coupling piece is a respective bearing receptacle for a bearing peg of the coupling part associated with the wiper blade, which dips between the legs of the U of the coupling piece associated with the wiper arm; and if finally the inside of at least one leg of the U forms the wall that is provided with the support shoulder.

Expediently, the coupling part associated with the wiper blade has a base body, on which the two bearing pegs are disposed in such a way that they have a common pivot axis, and furthermore at least one face of the base body forms the surface that is provided with the interception shoulder.

If both the support shoulder and the interception shoulder have a course that is curved about the axis of the hinge, and the respective radius of curvature corresponds to the respective spacing from the pivot axis, a comparatively large-area contact of the two shoulders with one another results, which reduces their wear.

An especially simple, economical embodiment of the invention is achieved if one end of one of spring tongues, which are deflectable substantially in the direction of the pivot axis, is retained on the base body, and the interception shoulder is disposed on the free ends of the spring tongues.

To further simplify the invention, the base body is made from a spring-elastic plastic, and the spring tongue provided with the interception shoulder is integrally joined to it.

An especially simple version of the invention, because it has no additional components, results if a slit open at the edge toward the shoulder is present in the region of the interception shoulder between the base body and the spring tongue, the width of which slit is greater than the effective width of the interception shoulder.

In certain applications it can be advantageous if a plurality of support shoulders and interception shoulders are disposed on each of the two coupling elements.

If one support shoulder is embodied on each of the two legs of the U of the coupling piece associated with the wiper arm, which legs fit over the base bodies of the coupling part associated with the wiper blade, and furthermore a spring tongue provided with the interception shoulder is disposed on each of the two sides, adjacent the legs of the U, of the base body, an especially operationally reliable connection between the wiper blade and the wiper arm is obtained as a result of the double detent locking thus achieved.

According to the refinement of the invention, the two components of the connection device are separable from one another with a simple linear pulling-off motion oriented away from the pendulum shaft.

Especially simple conditions for this kind of pull-off or slip-on motion result if forklike bearing receptacles, associated with the hinge peg, have opening slits, pointing away from the pendulum shaft, outward on the coupling piece associated with the wiper arm, into which slits the bearing pegs of the coupling part associated with the wiper blade can be introduced.

Further advantageous refinements and features of the invention are disclosed in the ensuing description of an exemplary embodiment shown in the associated drawing.

DRAWING

In the drawing:

FIG. 1 is a side view of a wiper apparatus according to the invention;

FIG. 2 is a plan view of the wiper apparatus of FIG. 1;

Figure 3:
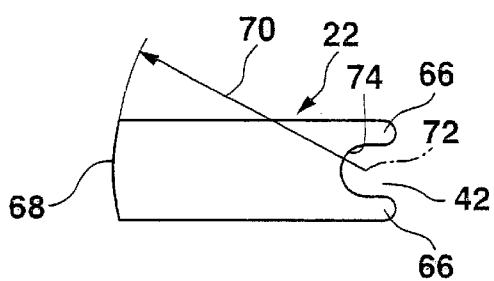
FIG. 3 is an enlarged side view of a coupling piece associated with the wiper arm.
Figure 4:
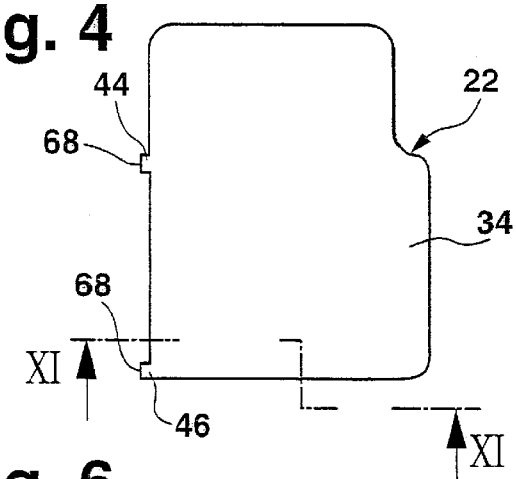
FIG. 4 is a plan view on the coupling piece of FIG. 3.
Figure 6:
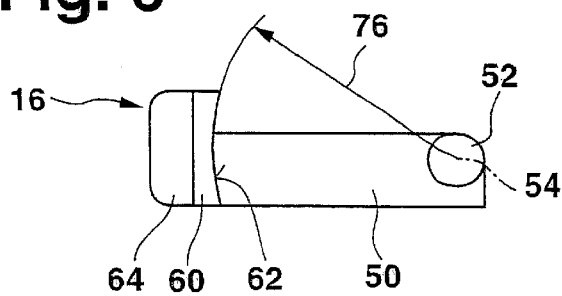
FIG. 6 is an enlarged side view of a coupling part associated with the wiper blade.

FIG. 11 in an enlarged view shows the assembly of the coupling elements of FIGS. 3 and 6 and in section along the line XI—XI of FIG. 4;

FIG. 12 is a fragmentary section along the line XII—XII in FIG. 13 through the arrangement of FIG. 11;

FIG. 13 is a section taken along the line XIII—XIII through the arrangement of FIG. 11; and FIG. 14 shows the mounted positions of the wiper arm and the wiper blade.

DESCRIPTION OF THE EXEMPLARY EMBODIMENT

A wiper blade 10 shown in FIGS. 1 and 2 has a bandlike-elongated, spring-elastic, one- or multi-piece support element 12, on whose top, toward with the window to be wiped, there is a coupling part 16 associated with the wiper blade, which part belongs to a connection device 14 and with the aid of which the wiper blade 10 can be connected separably to a driven wiper arm 18 that is guided on the body of a motor vehicle. To that end, the wiper arm is provided on its free end 20 with a coupling piece 22 that also belongs to the connection device 14 or in other words to the wiper arm. An elongated, rubber-elastic wiper strip 24 is disposed parallel to the longitudinal axis on the underside, toward the window, of the support element 12. The wiper arm 16 and thus also the coupling piece 22 cooperating with the coupling part 16 of the wiper blade 10 are urged in the direction of the arrow 26 toward the window 28 to be wiped, whose surface to be wiped is represented in FIG. 3 by a dot-dashed line 30. Since the dot-dashed line 30 is intended to represent the most pronounced curvature of the window surface, it is clearly apparent that the curvature of the unstressed wiper blade 10, resting with both ends on the window 28, is greater than the maximum window curvature (FIG. 1). Under the contact pressure (arrow 26), the wiper blade 10 presses with the wiper lip 32 of its wiper strip 24 against the window surface 30 over the full length of the wiper blade. In the process, a tension builds up in the bandlike, spring-elastic support element 12 that assures a proper contact of the wiper strip 24, or wiper lip 32, over its full length on the vehicle window 28. Since the window, which as a rule is spherically curved, is not a portion of a surface of a sphere the wiper blade 10 relative to the wiper arm 16 must be capable of constant adaptation during its wiping motion to the respective location and course of the window surface 30. The connection device 14 is therefore simultaneously embodied as a hinge connection (swivel joint) between the wiper blade 10 and the wiper arm 18, the pivot axis 54 of which connection extends essentially in the wiping or pendulum direction (double arrow 86 in FIG. 2).

The special design of the attachment or connection device 14 and of the two apparatus elements 16 and 22 belonging to it will now be described in further detail.

Figure 5:
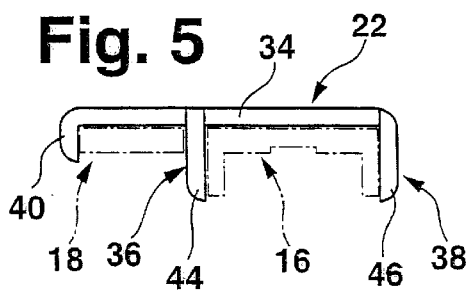
FIG. 5 is another side view of the coupling piece of FIG. 3.

The coupling piece 22, shown separately in FIGS. 3–5, has a base plate 34, on which two spaced-apart guide walls 36 and 38 are located. One guide wall 36 is mounted in the middle region of the base plate 34, while the other guide wall 38 is mounted on a peripheral region of the base plate 34. The two guide walls 36 and 38 are disposed parallel to one another. In the mounted wiper apparatus, they extend in the longitudinal direction of the wiper arm, in a plane vertical to the window 28. In this portion of the coupling piece 22, the result is accordingly a U-shaped cross section, and the two guide walls 36, 38 form the legs of the U that attach to the U-shaped base plate 34. Spaced apart from the first guide wall 36 and on the side remote from the lower wall 38, the base plate 34 is provided with a clawlike attachment 40, which is likewise oriented parallel to the wall 36. Viewed from the plate 34 outward, the attachment 40 is shorter than the two guide walls 36 and 38 (FIG. 5). From FIG. 3 it can be seen that the two guide walls 36 and 38 are each provided on one face end with a peripherally open receiving or bearing opening 42, forming a respective receiving or bearing fork 42. The other face ends of the guide walls 36 and 38 protrude past the base plate 34 with support shoulders 44 and 46, which also continue into the region of the base plate (FIG. 4).

Figure 7:
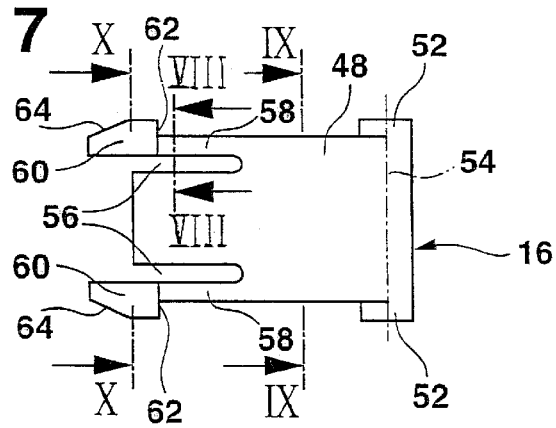
FIG. 7 is a plan view on the coupling part of FIG. 6.
Figure 8:
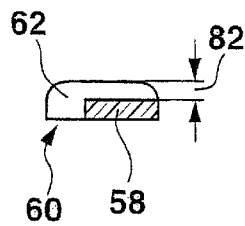
FIG. 8 is a fragmentary section along the line VIII—VIII through the coupling part of FIG. 7.
Figure 9:
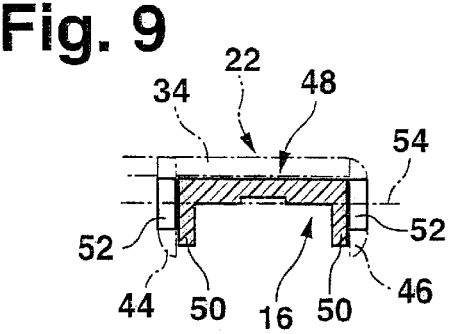
FIG. 9 is a section rotated by 90°, taken along the line IX—IX through the coupling part of FIG. 7.
Figure 10:
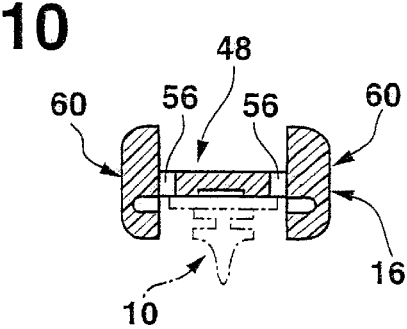
FIG. 10 is a section rotated by 90°, taken along the line X—X through the coupling part of FIG. 7.

The design of the coupling part 16 associated with the wiper blade can be seen from FIGS. 6–10. It has a base body 48 (FIG. 9) of basically U-shaped cross section, the two legs 50 of which U are spaced apart from one another. On each of the two outer walls or outer faces, facing away from one another, of the legs 50 of the U, there is a respective bearing peg 52, and the two peg axes are aligned with one another and form a common pivot axis 54. As FIGS. 6 and 7 show in particular, the two bearing pegs 52 are embodied on one end portion of the base body 48. On the other end portion of the base body 16, the base body is provided with two peripherally open slits 56, which are disposed directly on the inside of the two legs 50 of the U. Since the coupling part 16 is made from an elastic plastic, the result is two spring tongues 58, joined integrally to the base body 48, which are formed by the legs 50 of the U. In the exemplary embodiment, these spring tongues 58 extend past the U-shaped base body 48. On their free ends, the spring tongues 58 are provided with support strips 60, which extend transversely to the longitudinal direction past the U-shaped base body 48 (FIG. 10). The support strips 60 also extend past the outer sides or faces, facing away from one another, of the legs 50 of the U. Accordingly, on each of the two support strips 60 a respective interception shoulder 62 is formed, attaching to the respective outer face and each associated with one of the support shoulders 44 of the coupling piece 22. In addition, on their free ends remote from the bearing pegs 52, each of the two support strips 60 is provided with a respective run-up bevel 64, so that the two support strips narrow toward the free ends of the spring tongues 58 (FIG. 7). In adaptation of the coupling piece 22 associated with the wiper arm to the coupling part 16 associated with the wiper blade, the bearing forks 42, which are open on the side remote from the pendulum shaft 88, of the coupling piece 22 are adapted to the diameter of the bearing pegs 52 of the coupling part 16. This means that the spacing of the two tines 66 of the fork from one another assures a proper lateral guidance of the two bearing pegs 52 when they are introduced into the fork. FIG. 3 also shows that the support faces 68 of the support shoulders 44 and 46 extend with a radius 70 whose center 72 is identical to a further center about which a bearing or guide face 74 of the bearing fork 42 extends. The radius of curvature of the guide face 74 corresponds to the radius of the jacket faces of the bearing pegs 52. Since both centers of the two bearing forks 42 coincide with the center 72 of the support faces 44 and 46, the result is again an axis extending through these two centers 72, or pivot axis, which is identical to the pivot axis 54 once the two components belonging to the connection device 14 (that is, the coupling part 16 and the coupling piece 22) have been put together (FIG. 11). It should also be noted that—as FIG. 6 in particular shows—the interception shoulders 62 embodied on the two support strips 60 in their course also follow a radius 76 that is identical to the radius 70 of the support faces 68.

From FIG. 5, it can be seen that the spacing between the attachment 40 and the inner guide wall 36 is maintained such that a reception channel for the wiper arm 18 is obtained. The spacing between the two guide walls 36 and 38 is adapted to the width of the base body 48 of the coupling part 16. For the sake of clarity, the contours of the wiper arm 18 and the coupling part 16 have been shown in dot-dashed lines in the mounted position in FIG. 5. It can also be seen there that the walls 36, 38 are adjacent to the surfaces associated with them—that is, the outsides of the legs 50 of the U—in such a way that good lateral guidance of the wiper blade 10 on the wiper arm 18, 22 results. Conversely, dot-dashed lines in FIG. 9 indicate the mounted position of the coupling piece 22 on the coupling part 16. FIG. 10 shows the mounting position of the coupling part 16 on the wiper blade 10, the wiper blade being represented by dot-dashed lines.

In order to secure the wiper blade, provided with the coupling part 16, to the wiper arm 18 that carries the coupling piece 22, first the wiper blade is put in the position shown in FIG. 14 relative to the wiper arm 18. Next, the wiper blade is thrust in the direction of the arrow 78, and care is taken that the spring tongues 58 enter between the two guide walls 36 and 38. During this mounting motion 78, the run-up bevels 64 in the region of the bearing fork 42 first strike the guide walls 36 and 38, so that the spring tongues 58, together with their support strips 60, are deflected in the direction of the arrows 80 in FIG. 13, until they reach the position shown in dot-dashed lines in FIG. 13. Since the width of the slits 56 is greater than the effective width 82 of the interception shoulders 62, problem-free passage of the coupling part 16 through the channel defined by the guide walls 36 and 38 of the coupling piece 22 is possible. Once the operating position between the wiper arm and the wiper blade as shown in FIGS. 11, 12 and 13 is reached, the spring tongues 58, which until now have been prestressed, spring back, counter to the direction of the arrows 80, into their outset position shown in solid lines in FIG. 13. After that, the interception shoulders 62 of the coupling part 16 and the support faces 68 of the support shoulders 44 and 46 of the coupling piece 22 are located directly opposite one another. As a result of the attendant adaptation of the support face radii 70 and the interception shoulder radii 76, a practically clearance-free connection between the wiper arm and the wiper blade is then assured, because in the position then attained, the jacket faces of the bearing pegs 52 also rest on the guide faces 74 of the bearing forks 42. As FIG. 14 shows, all that is required to attach the wiper blade 10 to the wiper arm 18 is a linear motion (arrow 78), with no need to raise the wiper arm 18 outward past its operational position.

For removing the wiper blade 10 from the wiper arm 18, the two spring tongues 58 must be deflected in the direction of the arrows 80, counter to the spring force or restoring force, and specifically far enough that problem-free passage of the support strips 60 is possible through the receiving channel of the wiper arm bounded by the guide walls 36 and 38, counter to the direction of the arrow 78 in FIG. 14. Once again, this does not require lifting the wiper arm 18 from the window past its operational position. It is clear particularly from FIG. 11 that between the wiper blade 10 and the wiper arm 18, or between the coupling part 16 and the coupling piece 22, a swiveling motion about the pivot axis 54 in the direction of the double arrow 84 in FIG. 1 is possible, without causing the support shoulders and interception shoulders to come completely out of their opposed position, so that an operationally reliable connection between the wiper arm 18 and the wiper blade 10 is achieved. This pivoting motion is required for the adaptation, explained at the outset, of the wiper blade to the course of the window surface 30.

It can also be seen from FIG. 2 that the pivot axis 54 is located essentially in the direction of the wiping or pendulum direction (double arrow) 86, and that in the mounted wiper apparatus, the support shoulders 44, 46 provided with the support faces 68 and the interception shoulder 62 are located between the pendulum shaft 88 and the pivot axis 54. From FIGS. 11, 13 and 14, it can be seen that the support shoulders 44 and 46, or 68, solidly connected to the wiper arm point toward the pendulum shaft 88 (FIG. 2), and that the interception shoulders 62, pointing away from the pendulum shaft 88, are oriented toward the support shoulders. From the above functional description, it can also be seen that at least one of the two shoulders is movable counter to a restoring force entirely out of the opposed position relative to the other shoulder. In this case, the restoring force is the force counter to which the spring tongues 58 must be moved outward (FIG. 13) for the sake of mounting and unmounting between the wiper blade 10 and the wiper arm 18.

What is claimed is:

1. A wiper apparatus for windows of motor vehicles, comprising at least one wiper arm (18), guided on the motor vehicle and driven in pendulum motion, wherein on a free end of the wiper arm remote from a pendulum shaft (88), a wiper blade (10), elongated transversely to a direction of the pendulum motion (double arrow 86) and capable of being pressed against the window (28), is separably hinged via a connection device (14) that has first and second pivotally connected coupling elements (22 and 16) associated with the wiper arm and the wiper blade, respectively, wherein a pivot axis (54) of the device extends substantially in the pendulum direction, and the wiper apparatus has at least one support shoulder (44, 46; 68), solidly connected to the first coupling element on the wiper arm and pointing toward the pendulum shaft (88), said support shoulder is located opposite an associated interception shoulder (62), solidly connected to the second coupling element on the wiper blade and pointing away from the pendulum shaft (88), wherein at least one of the two shoulders (44, 46, 68; 62) can be moved counter to a restoring force all the way out of the opposed position relative to the other shoulder (62; 44, 46, 68), and further comprising, said second coupling element having a base body (48) with spring tongues (58) extending therefrom said spring tongues deflectable substantially in a direction of the pivot axis (54), and wherein the interception shoulder (62) is disposed on a free end of one of said spring tongues.

2. The wiper apparatus of claim 1, wherein the support shoulder (44, 46, 68) solidly connected to the wiper arm is disposed on the first coupling element (22) associated with the wiper arm.

3. The wiper apparatus of claim 2, wherein the first coupling element (22) associated with the wiper arm has a wall (36, 38), located in a plane vertical to the window (28) and extending substantially in a direction of a longitudinal axis of the wiper arm, wherein said wall is adjacent to a surface of the second coupling element (16) associated with the wiper blade, and wherein the support shoulder (44, 46, 68) is embodied on the wall and the interception shoulder (62) is embodied on the surface.

4. The wiper apparatus of claim 3, wherein the first coupling element (22) associated with the wiper arm, transversely to the longitudinal axis of the wiper arm (18), has a U-shaped cross section and has two legs; wherein disposed in each of the legs (36, 38) of the U of the first coupling element (22) is a respective bearing receptacle (42) for a bearing peg (52) of the second coupling element (16) associated with the wiper blade, wherein said second coupling element (16) dips between the legs of the first coupling element (22) associated with the wiper arm; and wherein an inside of at least one of said legs (36, 38) forms the wall that is provided with the support shoulder.

5. The wiper apparatus of claim 4, wherein a plurality of support shoulders (44) and interception shoulders (62) are disposed on each of the two coupling elements (16 and 22).

6. The wiper apparatus of claim 3, wherein the second coupling element (16) associated with the wiper blade has a base body (48), on which two bearing pegs (52) are disposed in such a way that the bearing pegs define the pivot axis (54), and at least one face of the base body forms the surface that is provided with the interception shoulder (62).

7. The wiper apparatus of claim 1, wherein the support shoulder (44, 46, 68) and the interception shoulder (62) are disposed between the pendulum shaft (88) and the pivot axis (54).

8. The wiper apparatus of claim 1, wherein both the support shoulder (44, 46, 68) and the interception shoulder (62) have a course that is curved about the axis (54), and wherein a respective radius of curvature (70 and 76), of the shoulders corresponds to a respective spacing from the pivot axis (54).

9. The wiper apparatus of claim 1, wherein the base body (48) is made from a spring-elastic plastic, and wherein the spring tongue (58) provided with the interception shoulder is integrally joined to it.

10. The wiper apparatus of claim 9, wherein a slit (56) is provided in the base body and is open at an edge thereof, said slit is provided in a region of the interception shoulder (62) between the base body (48) and the spring tongue (58) provided with the interception shoulder, wherein a width of said slit is greater than an effective width (82) of the interception shoulder (62).

11. The wiper apparatus of claim 1, wherein the coupling elements of the connection device (14) are separable from one another in direction away from the pendulum shaft (88).

12. the wiper apparatus of claim 11, wherein forked bearing receptacles (42) are provided on said first coupling element, said receptacles are associated with a hinge peg (52) provided on the second coupling element, said receptacles have opening slits, pointing away from the pendulum shaft (88).

13. A wiper apparatus for windows of motor vehicles, comprising at least one wiper arm (18), guided on the motor vehicle and driven in pendulum motion, wherein on a free end of the wiper arm remote from a pendulum shaft (88), a wiper blade (10), elongated transversely to a direction of the pendulum motion (double arrow 86) and capable of being pressed against the window (28), is separably hinged via a connection device (14) that has first and second pivotally connected coupling elements (22 and 16) associated with the wiper arm and the wiper blade, respectively, wherein a pivot axis (54) of the device extends substantially in the pendulum direction, and the wiper apparatus has at least one support shoulder (44, 46; 68), solidly connected to the first coupling element on the wiper arm and pointing toward the pendulum shaft (88), said support shoulder is located opposite an associated interception shoulder (62), solidly connected to the second coupling element on the wiper blade and pointing away from the pendulum shaft (88), wherein at least one of the two shoulders (44, 46, 68; 62) can be moved counter to a restoring force all the way out of the opposed position relative to the other shoulder (62; 44, 46, 68), wherein both the support shoulder (44, 46, 68) and the interception shoulder (62) have a course that is curved about the pivot axis (54), wherein a respective radius of curvature (70, 76) of the shoulders corresponds to a respective spacing from the pivot axis (54), and further comprising said second coupling element having a base body (48) with spring tongues (58) extending therefrom said spring tongues deflectable substantially in a direction of the pivot axis (54), and wherein the interception shoulder (62) is disposed on a free end of one of said spring tongues.

14. A wiper apparatus for windows of motor vehicles, comprising at least one wiper arm (18), guided on the motor vehicle and driven in pendulum motion, wherein on a free end of the wiper arm, remote from a pendulum shaft (88), a wiper blade (10), elongated transversely to a direction of the pendulum motion (double arrow 86) and capable of being pressed against the window (28), is separably hinged via a connection device (14) that has first and second pivotally connected coupling elements (22 and 16) associated With the wiper arm and the wiper blade, respectively, wherein a pivot axis (54) of the device extends substantially in the pendulum direction, and the wiper apparatus has at least one support shoulder (44, 46; 68), solidly connected to the first coupling element on the wiper arm and pointing toward the pendulum shaft (88), said support shoulder is located opposite an associated interception shoulder (62), solidly connected to the second coupling element on the wiper blade and pointing away from the pendulum shaft (88), wherein at least one of the two shoulders (44, 46, 68; 62) can be moved counter to a restoring force all the way out of the opposed position relative to the other shoulder (62; 44, 46, 68), wherein the first coupling element (22) is generally U-shaped and has two legs (36, 38), wherein one said support shoulder (44, 46, 48) is formed on each of said two legs (36, 38) of the first coupling element (22), wherein said legs of the first coupling element (22) fit over a base body (48) of the second coupling element (16), and wherein a spring tongue (58) is provided on said base body, includes the interception shoulder (62) and is disposed on each of two sides of said base body (48) adjacent the legs of the first coupling element (22).

* * * * *